United States Patent
Utsugi (10) Patent No.: US 8,243,173 B2
(45) Date of Patent: Aug. 14, 2012

(54) IMAGE PROCESSING EQUIPMENT AND DIGITAL CAMERA

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 395 days.

(21) Appl. No.: 12/654,968

(22) Filed: Jan. 11, 2010

(65) Prior Publication Data
US 2010/0182462 A1 Jul. 22, 2010

(30) Foreign Application Priority Data
Jan. 19, 2009 (JP) ................................. 2009-009131

(51) Int. Cl.
 *H04N 5/217* (2011.01)
 *G06K 9/40* (2006.01)
(52) U.S. Cl. ........................................ 348/241; 382/275
(58) Field of Classification Search .................. None
See application file for complete search history.

(56) References Cited

U.S. PATENT DOCUMENTS

| 5,119,195 | A * | 6/1992 | Christopher ............... 348/623 |
| 6,937,772 | B2 * | 8/2005 | Gindele ..................... 382/240 |
| 7,856,150 | B2 * | 12/2010 | Li et al. .................... 382/260 |
| 7,929,031 | B2 * | 4/2011 | Nakayama ................. 348/241 |
| 8,040,401 | B2 * | 10/2011 | Tsuruoka .................. 348/241 |
| 2001/0035916 | A1 * | 11/2001 | Stessen et al. ............. 348/607 |
| 2004/0120014 | A1 * | 6/2004 | Nakajima et al. .......... 358/3.26 |
| 2005/0047656 | A1 * | 3/2005 | Luo et al. .................. 382/167 |
| 2008/0122953 | A1 * | 5/2008 | Wakahara et al. ......... 348/241 |
| 2010/0182452 | A1 * | 7/2010 | Utsugi ..................... 348/231.2 |

FOREIGN PATENT DOCUMENTS
JP A-2000-224421 8/2000
* cited by examiner

*Primary Examiner* — Albert Cutler
(74) *Attorney, Agent, or Firm* — Oliff & Berridge, PLC (57) ABSTRACT

In order to perform a pipeline processing on a noise filtering processing, which uses a multi-resolution noise filtering, with a few line memories, the way to select an area of a reduced image which is used by the extraction of the low-frequency noise component from the reduced image is modified. By extracting the low-frequency noise component from the area being selected by the modified way, it is possible to suppress a volume of image data which needs to be read prior to the noise filtering object pixel.

9 Claims, 9 Drawing Sheets

Fig. 1

Fig. 3(A) RANGE OF REFERENCE IN 1/16 FREQUENCY BAND NOISE EXTRACTING PROCESSING

1/16 REDUCED IMAGE

Fig. 3(B) RANGE OF REFERENCE IN 1/4 FREQUENCY BAND NOISE EXTRACTING PROCESSING

1/4 REDUCED IMAGE AFTER 1/16 LOW-FREQUENCY NOISE IS FILTERED

Fig. 3(C) RANGE OF REFERENCE IN HIGH-FREQUENCY NOISE FILTERING

ORIGINAL SIZE IMAGE AFTER COMBINED LOW-FREQUENCY NOISE IS FILTERED

Fig. 4(A) CONTENTS OF EACH LINE MEMORY IN HIGH-FREQUENCY NOISE FILTERING AT "4n" ROW

| | | | | | | | | | | | | |
|---|---|---|---|---|---|---|---|---|---|---|---|---|
| 1/16 REDUCED IMAGE | △ | ○ | ○ | ○ | ○ | ○ | ○ | ○ | | | | |
| 1/16 FREQUENCY BAND NOISE | | | | | | | | △ | ◎ | | | |
| ROW NUMBER OF 1/16 REDUCED IMAGE | n-7 | n-6 | n-5 | n-4 | n-3 | n-2 | n-1 | n | n+1 | | | |
| 1/4 REDUCED IMAGE | | | | | | | △ | ○ | △ | ◎ | | |
| 1/4 NOISE FILTERED IMAGE | | | | | | | | ○ | ◎ | | | |
| 1/4 FREQUENCY BAND NOISE | | | | | | | | | | ◎ | | |
| ROW NUMBER OF 1/4 REDUCED IMAGE | | | | | | | 2n-1 | 2n | 2n+1 | 2n+2 | 2n+3 | |
| ORIGINAL IMAGE | | | | | | | △ | ○ | △ | ○ | ○ | ◎ |
| LOW-FREQUENCY NOISE FILTERED IMAGE | | | | | | | | ○ | ◎ | ○ | ○ | |
| ROW NUMBER OF ORIGINAL IMAGE | | | | | | | 4n-2 | 4n-1 | 4n | 4n+1 | 4n+2 | 4n+3 | 4n+4 | 4n+5 | 4n+6 | 4n+7 |

Fig. 4(B) CONTENTS OF EACH LINE MEMORY IN HIGH-FREQUENCY NOISE FILTERING AT "4n+1" ROW

| | | | | | | | | | | | | | | | | | | |
|---|---|---|---|---|---|---|---|---|---|---|---|---|---|---|---|---|---|---|
| 1/16 REDUCED IMAGE | O | ... | O | ... | O | ... | O | ... | O | | | | | | | | | |
| 1/16 FREQUENCY BAND NOISE | | | | | | | | | O | | | | | | | | | |
| ROW NUMBER OF 1/16 REDUCED IMAGE | n-7 | | n-6 | | n-5 | n-4 | n-3 | n-2 | n-1 | n | | n+1 | | | | | | |
| 1/4 REDUCED IMAGE | | | | | | | | | | | | O | | | | | | |
| 1/4 NOISE FILTERED IMAGE | | | | | | | | | | O | | △ | | | | | | |
| 1/4 FREQUENCY BAND NOISE | | | | | | | | | | O | | | | | | | | |
| ROW NUMBER OF 1/4 REDUCED IMAGE | | | | | | | | | | 2n-1 | | 2n | | 2n+1 | 2n+2 | 2n+3 | | |
| ORIGINAL IMAGE | | | | | | | | | | | △ | O | O | O | O | | | |
| LOW-FREQUENCY NOISE FILTERED IMAGE | | | | | | | | | | | | △ | O | O | ◎ | | | |
| ROW NUMBER OF ORIGINAL IMAGE | | | | | | | | | | 4n-2 | 4n-1 | 4n | 4n+1 | 4n+2 | 4n+3 | 4n+4 | 4n+5 | 4n+6 | 4n+7 | 4n+8 |

Fig. 4(C) CONTENTS OF EACH LINE MEMORY IN HIGH-FREQUENCY NOISE FILTERING AT "4n+2" ROW

| | | | | | | | | | | |
|---|---|---|---|---|---|---|---|---|---|---|
| 1/16 REDUCED IMAGE | ○ | … | ○ | ○ | ○ | ○ | | | | |
| 1/16 FREQUENCY BAND NOISE | | | | | | ○ | | | | |
| ROW NUMBER OF 1/16 REDUCED IMAGE | n-7 | n-6 | n-5 | n-4 | n-3 | n-2 | n-1 | n | n+1 | | |
| 1/4 REDUCED IMAGE | | | | | | | | △ | | ◎ | |
| 1/4 NOISE FILTERED IMAGE | | | | | | | | | ○ | ◎ | |
| 1/4 FREQUENCY BAND NOISE | | | | | | | | | | ◎ | |
| ROW NUMBER OF 1/4 REDUCED IMAGE | | | | | | | 2n-1 | 2n | 2n+1 | 2n+2 | 2n+3 |
| ORIGINAL IMAGE | | | | | | | | | △ ○ ○ ○ | △ ○ ○ ○ | ○ ○ ○ ◎ |
| LOW-FREQUENCY NOISE FILTERED IMAGE | | | | | | | | △ | ○ ○ ○ ◎ | | |
| ROW NUMBER OF ORIGINAL IMAGE | | | | | | | | 4n-2 4n-1 | 4n | 4n+1 4n+2 4n+3 | 4n+4 4n+5 4n+6 4n+7 | 4n+8 4n+9 |

Fig. 4(D) CONTENTS OF EACH LINE MEMORY IN HIGH-FREQUENCY NOISE FILTERING AT "4n+3" ROW

| | | | | | | | | | | | | |
|---|---|---|---|---|---|---|---|---|---|---|---|---|
| 1/16 REDUCED IMAGE | ○ | ○ | ○ | ○ | ○ | ○ | ○ | ○ | | | | |
| 1/16 FREQUENCY BAND NOISE | | | | | | | | ○ | ○ | | | |
| ROW NUMBER OF 1/16 REDUCED IMAGE | n-7 | n-6 | n-5 | n-4 | n-3 | n-2 | n-1 | n | n+1 | | | |
| 1/4 REDUCED IMAGE | | | | | | | | | | | ○ | |
| 1/4 NOISE FILTERED IMAGE | | | | | | | ○ | ○ | ○ | | | |
| 1/4 FREQUENCY BAND NOISE | | | | | | | | △ | | | | |
| ROW NUMBER OF 1/4 REDUCED IMAGE | | 2n-1 | | 2n | | 2n+1 | | 2n+2 | | 2n+3 | | 2n+4 |

| | 4n-2 | 4n-1 | 4n | 4n+1 | 4n+2 | 4n+3 | 4n+4 | 4n+5 | 4n+6 | 4n+7 | 4n+8 | 4n+9 | 4n+10 |
|---|---|---|---|---|---|---|---|---|---|---|---|---|---|
| ORIGINAL IMAGE | | | | △ | ○ | ○ | ○ | ○ | | | | | |
| LOW-FREQUENCY NOISE FILTERED IMAGE | | | | | | ◎ | | | | | | | |
| ROW NUMBER OF ORIGINAL IMAGE | 4n-2 | 4n-1 | 4n | 4n+1 | 4n+2 | 4n+3 | 4n+4 | 4n+5 | 4n+6 | 4n+7 | 4n+8 | 4n+9 | 4n+10 |

IMAGE PROCESSING EQUIPMENT AND DIGITAL CAMERA

CROSS REFERENCE TO THE RELATED APPLICATIONS

This application is based upon and claims the benefit of priority from Japanese Patent Application No. 2009-009131, filed on Jan. 19, 2009, the entire contents of which are incorporated herein by reference.

BACKGROUND

1. Field

The present embodiments relate to an image processing equipment and a digital camera to apply a noise filtering using a multi-resolution analysis for an obtained image.

2. Description of the Related Art

A noise filtering using a multi-resolution analysis (hereinafter, called as a multi-resolution noise filtering) is known as one of methods to filter low-frequency noises appeared in an image data obtained by a digital camera and so on.

In the multi-resolution noise filtering, a noise filtering is performed for reduced images generated with plurality of reduction ratios, and effects thereof are reflected on the original image in which has an original size. Accordingly, for example, the filtering of the low-frequency noises spreading for several dozen pixels in a row direction and/or a column direction is achieved (refer to Japanese Unexamined Patent Application Publication No. 2000-224421).

For example, a down-sampling process is applied to the original image with reduction ratios of one-fourth respectively in the row direction and the column direction to generate a reduced image in one-sixteenth, and the noise components are extracted from this reduced image. Low-frequency noise components in an original image size are estimated by performing an up-sampling using a linear interpolation, for example, on the extracted noise components. The low-frequency noise components estimated as stated above are subtracted from the original image, and thereby, the low-frequency noise components are filtered from the original image.

In a recent high pixel digital camera, there is a case when the low-frequency noises spreading for several dozen pixels wide appear. It is necessary to prepare a line memory storing an image data in a range larger than a range assumed to be a spread of the low-frequency noises so that the filtering of the low-frequency noises as stated above is performed promptly by a pipeline processing.

However, if such a vast line memory is prepared, a significant increase in a circuit scale is caused, and it leads an increase in cost of an image processing equipment.

SUMMARY

A proposition is to provide an image processing equipment and a digital camera achieving a pipelined multi-resolution noise filtering with a few line memories.

The above-stated proposition can be achieved by an image processing equipment and a digital camera described hereinafter.

An image processing equipment and a digital camera according to an aspect includes a line memory sequentially storing respective pixel values of pixels arranged in N rows M columns included in a processing object image and having a fewer number of rows than the N rows, an image reducing part sequentially generating a portion of a reduced image based on a portion of the processing object image stored in the line memory, a reduced image storing memory storing the reduced image generated at the image reducing part, a noise extracting part extracting a noise component of a noise filtering object pixel from an area, which is selected to include the noise filtering object pixel, in the reduced image stored in the reduced image storing memory, an up-sampling part calculating a noise component corresponding to a noise filtering object pixel of the processing object image by performing an up-sampling processing on the noise component being extracted, and a noise subtracting part performing subtraction of the noise component calculated at the up-sampling part from a pixel value of the noise filtering object pixel of the processing object image stored in the line memory and outputting a pixel value after the subtraction.

BRIEF DESCRIPTION OF THE DRAWINGS

FIG. 3(A) to FIG. 3(C) are views explaining ranges of references in a noise extraction.

FIG. 4(A) to FIG. 4(D) are views explaining a pipeline processing.

DETAILED DESCRIPTION OF THE EMBODIMENTS

Hereinafter, embodiments of the present application are described in detail based on the drawings.

Embodiment 1

Figure 1:
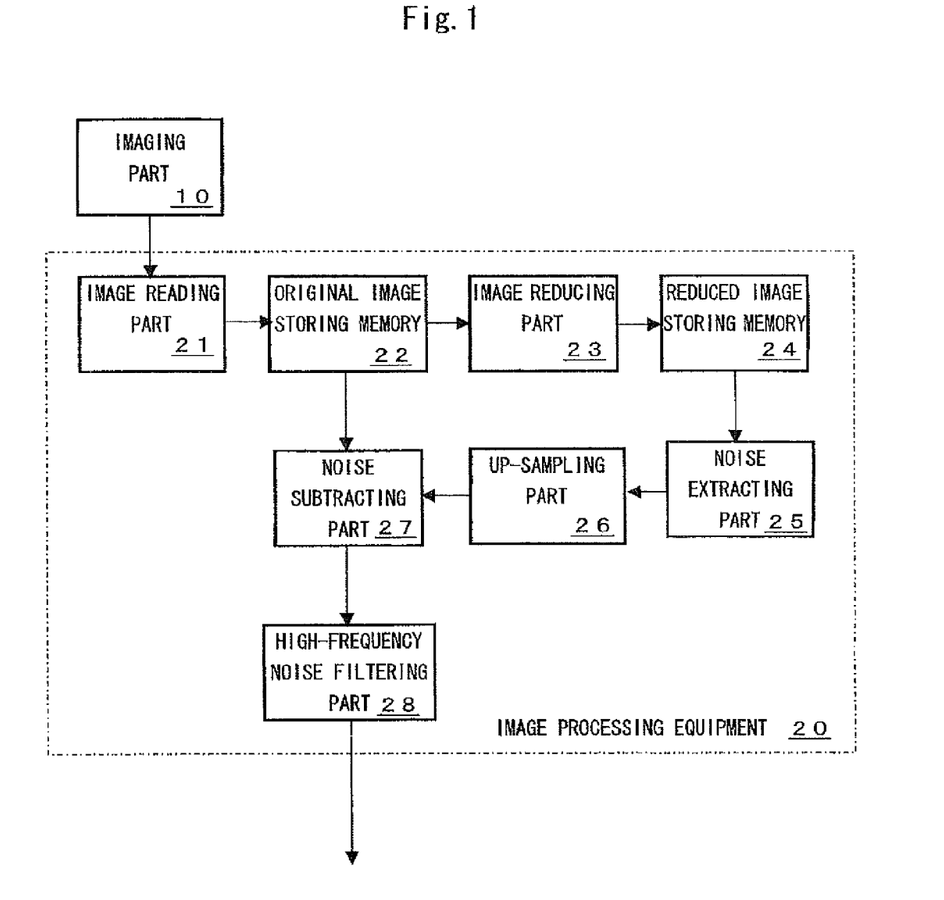
FIG. 1 is a view illustrating an embodiment of an image processing equipment.

An embodiment of an image processing equipment is illustrated in FIG. 1.

An image processing equipment 20 illustrated in FIG. 1 performs a multi-resolution noise filtering by a later-described pipeline processing while reading an original image photographed by an imaging part 10 included in a digital camera.

An image reading part 21 of the image processing equipment 20 sequentially reads a pixel value of each pixel arranged in a matrix state with N rows, M columns of the original image from a zero row, and provides the pixel value to a generation processing of a reduced image by an image reducing part 23 via an original image storing memory 22.

The image reducing part 23 performs a down-sampling applying a predetermined reduction ratio on an original image within a range newly read into the original image storing memory 22, and thereby, a part of a reduced image corresponding to a part of the newly read original image is generated. The part of the reduced image is stored in a reduced image storing memory 24.

Besides, a noise extracting part 25 refers to the reduced image within the range stored in the reduced image storing memory 24 to extract a low-frequency noise component. An up-sampling part 26 performs an up-sampling processing for the low-frequency noise component extracted by the noise extracting part 25. The low-frequency noise component corresponding to a size of an original image being the original image is generated by this up-sampling processing.

A noise subtracting part 27 filters the low-frequency noise by subtracting the low-frequency noise component from the original image stored in the original image storing memory 22, and provides the noise filtering result to a processing performed by a high-frequency noise filtering part 28.

Next, the noise extracting processing performed by the noise extracting part 25 is described in detail.

Figure 2:
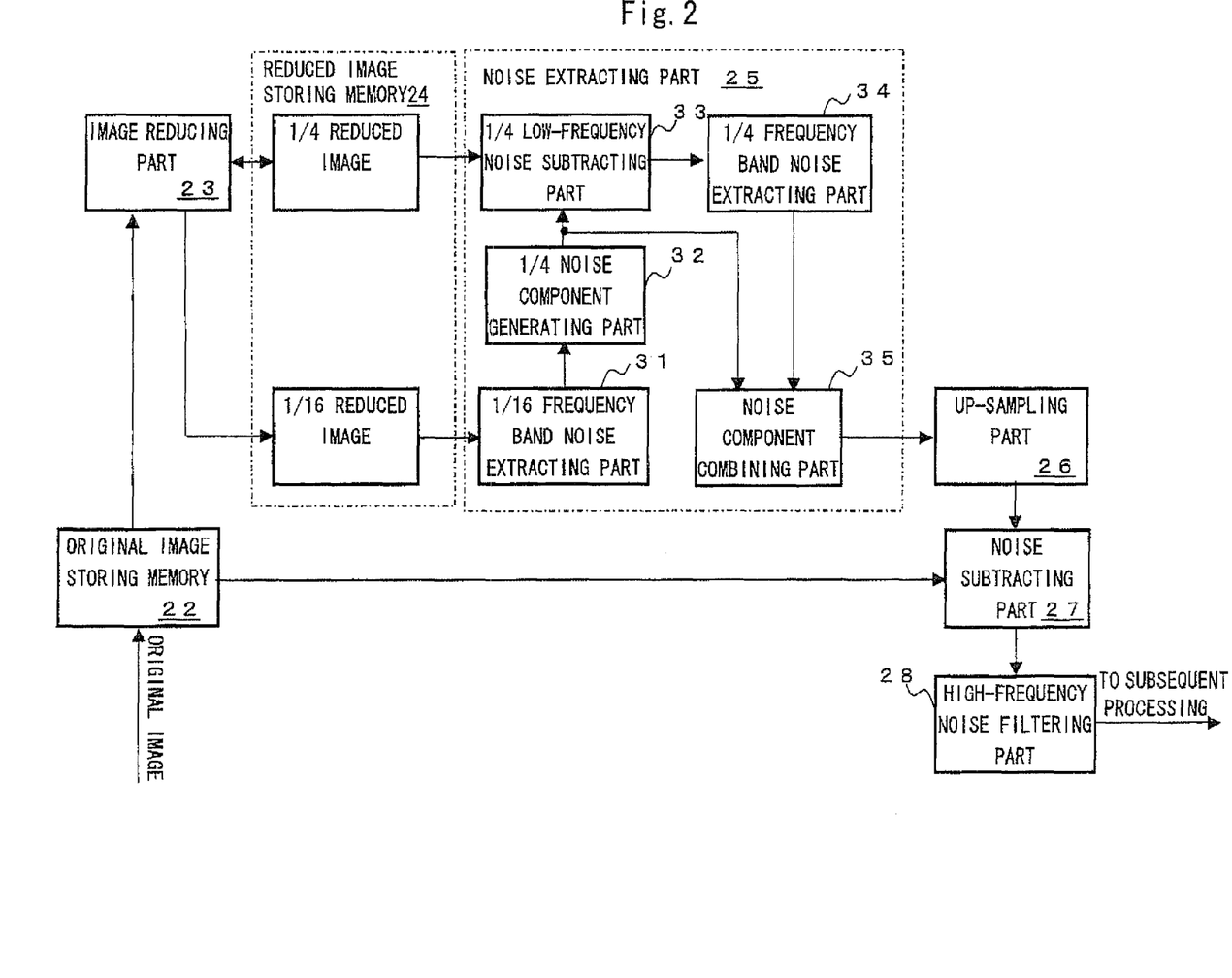
FIG. 2 is a view illustrating a detailed configuration of a noise extracting part.
Figure 3A:
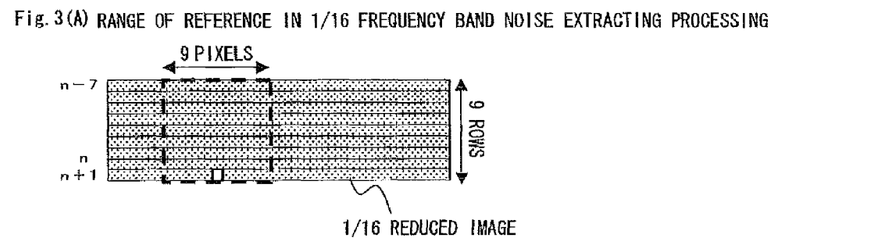
Figure 3B:
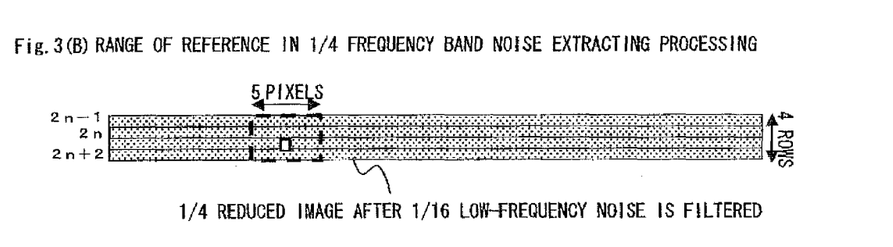
Figure 3C:
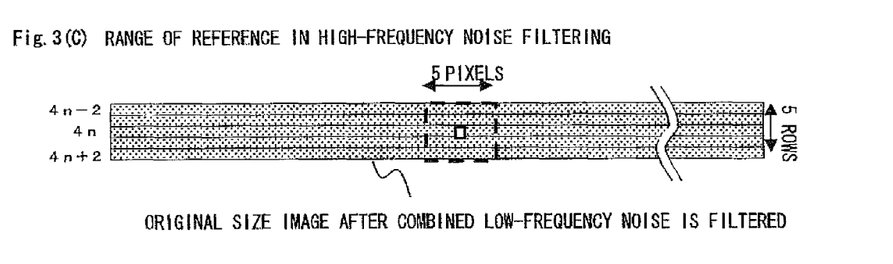

A detailed configuration of the noise extracting part is illustrated in FIG. 2. Besides, views explaining ranges of references in the noise extraction are illustrated in FIGS. 3(A) to 3(C).

The original image storing memory 22 is a line memory, for example, having a capacity storing an image data for five lines in an original image size. This original image storing memory 22 stores each line of the original image read by the image reading part 21 until the low-frequency noise component corresponding to the line is filtered by a subtraction of the noise subtracting part 27.

Besides, the image reducing part 23 performs a down-sampling respectively reducing the original image into half in the row and column directions based on every two rows of the original image data when, for example, an even numbered row in the original image is read into the original image storing memory 22. The row corresponding to a ¼ reduced image is generated by the down-sampling processing, and it is stored in the reduced image storing memory 24.

The reduced image storing memory 24 includes a line memory for, for example, one line to store the ¼ reduced image. The image reducing part 23 generates a ¹⁄₁₆ reduced image in which the ¼ reduced image is respectively reduced into half in the row and column directions based on a row of the newly calculated ¼ reduced image and a preceding row stored in the line memory. The ¹⁄₁₆ reduced image generated as stated above is stored in a line memory for, for example, nine rows provided at the reduced image storing memory 24 to store the ¹⁄₁₆ reduced image, and it is transferred to the noise extracting part 25.

A ¹⁄₁₆ frequency band noise extracting part 31 of the noise extracting part 25 performs the noise extracting processing on each pixel of the ¹⁄₁₆ reduced image with reference to a range being set to correspond to an object pixel of noise extraction. For example, the noise extracting processing on a pixel represented by white colored rectangle in FIG. 3(A) is performed with reference to a range illustrated by surrounding with a thick dotted line. The range referred to by the ¹⁄₁₆ frequency band noise extracting part 31 is four columns at both sides centering a column which corresponds to the object pixel of noise extraction among a row including the object pixel of noise extraction itself and eight rows generated before and stored in the line memory of the ¹⁄₁₆ reduced image. In this way, the range of reference of nine rows×nine pixels is provided to select more area of the ¹⁄₁₆ reduced image range corresponding to the original image range in which reading is already finished. The ¹⁄₁₆ frequency band noise extracting part 31 refers to the ¹⁄₁₆ reduced image included within the range and calculates a low-frequency noise component at a frequency band corresponding to the ¹⁄₁₆ reduced image with respect to the above-stated object pixel of noise extraction. For example, it is possible for the ¹⁄₁₆ frequency band noise extracting part 31 to extract the low-frequency noise component by applying a ε filter to the range of reference described above.

Specifically, pixels having smaller absolute value of a difference between a pixel value of the object pixel of noise extraction than a predetermined threshold value is selected from among the pixels inside the above-stated range of reference, and differences between the pixel values of all of the selected pixels and the pixel value of the object pixel of noise extraction are integrated. A value in which the obtained integrated value is divided by the number of pixels inside the range of reference (for example, 81) is set as the low-frequency noise component corresponding to the object pixel of noise extraction.

Incidentally, the above-stated predetermined threshold value may be set at a value approximately three times of a standard deviation of a noise of the reduced image. Besides, the noise extracting method is not limited to the above, but publicly known arbitrary methods can be applied thereto.

The low-frequency noise component at the frequency band corresponding to the ¹⁄₁₆ reduced image extracted as stated above is passed to a ¼ noise component generating part 32. The above-stated low-frequency noise component at the frequency band corresponding to the ¹⁄₁₆ reduced image is converted into a low-frequency noise component indicating a low-frequency noise at the above-stated frequency band in the ¼ reduced image by an up-sampling processing by the ¼ noise component generating part 32. For example, this ¼ noise component generating part 32 performs the up-sampling processing by using a line memory for the ¹⁄₁₆ reduced image size included therein. Namely, by performing a linear interpolation processing on the newly obtained noise component and the noise component stored in the line memory by the ¼ noise component generating part 32, the up-sampling processing making double in the row and column directions is realized. The above-stated low-frequency noise component is generated by this up-sampling processing, and it is provided for a processing of a ¼ low-frequency noise subtracting part 33.

The ¼ low-frequency noise subtracting part 33 performs a processing subtracting the low-frequency noise component from the ¼ reduced image stored in the above-stated line memory for the ¼ reduced image. The low-frequency noise component at the frequency band corresponding to the ¹⁄₁₆ reduced image is filtered out from the ¼ reduced image by this subtracting process, and the result is provided for a processing of a ¼ frequency band noise extracting part 34.

The ¼ frequency band noise extracting part 34 includes a line memory to store the low-frequency noise free ¼ reduced image received from the ¼ low-frequency noise subtracting part 33. A range of reference of the ¼ frequency band noise extracting part 34 is set corresponding to an object pixel of noise extraction as explained in next. For example, the noise extracting processing on a pixel represented by white colored rectangle in FIG. 3(B) is performed with reference to a range illustrated by surrounding with a thick dotted line. In an example in FIG. 3(B), the range of reference of the ¼ frequency band noise extracting part 34 is a range of four rows five columns including an object pixel of noise extraction of the low-frequency noise free ¼ reduced image. The range of the rows for referring is total of four rows having a row including the object pixel of noise extraction itself and two rows having row number smaller than the row including the object pixel of noise extraction and one row following the row including the object pixel of noise extraction of the low-frequency noise free ¼ reduced image. Also, the range of the columns is two pixels at both sides centering a position of an object pixel of noise extraction in the column direction. As stated above, the range of reference of the ¼ frequency band noise extracting part 34 of four rows×five pixels is put toward the portion of ¼ reduced image corresponding to the portion of the original image which has already read in. The ¼ frequency band noise extracting part 34 extracts the low-frequency noise component at the frequency band corresponding to the ¼ reduced image with respect to the object pixel of noise extraction by applying the ε filter for the range of reference.

A noise component combining part 35 performs a process of adding above-stated two kinds of the low-frequency noise components. One of the low-frequency noise components being performed the process of adding is the low-frequency noise component corresponding to the ¼ reduced image extracted at the ¼ frequency band noise extracting part 34. Another one of the low-frequency noise components being performed the process of adding is the low-frequency noise component obtained at the ¼ noise component generating part 32. This low-frequency noise component is the low-frequency noise at the frequency band corresponding to the ¹⁄₁₆ reduced image in the ¼ reduced image. The low-frequency noise component combined by the addition processing is provided for the processing of the up-sampling part 26.

The up-sampling part 26 converts the low-frequency noise component combined as stated above into the low-frequency noise component in the original image size by performing the up-sampling in each of the row and column directions.

The noise subtracting part 27 subtracts a row of low-frequency noise component obtained by the up-sampling part 26 from corresponding row of the original image which is stored in the original image storing part 22. The low-frequency noise at the frequency band corresponding to the ¼ reduced image and the low-frequency noise at the frequency band corresponding to the ¹⁄₁₆ reduced image are collectively filtered from the original image by the subtracting processing. The image of which low-frequency noise is filtered is provided for the processing of the high-frequency noise filtering part 28.

The high-frequency noise filtering part 28 includes a line memory which each row having capacity equivalent to that of row of the original image. The high-frequency noise filtering part 28 receives by rows for the image which the filtering of the low-frequency noise is finished as stated above, and stores the image into the line memory to perform the filtering of a high-frequency noise on the stored image. For example, the high-frequency noise filtering part 28 filters the high-frequency noise by applying the ε filter to a predetermined reference range included in the image stored in the line memory. An example of the range of reference is represented in FIG. 3(C) by surrounding with a thick dotted line. In the example in FIG. 3(C), the range of reference is a range of five rows×five pixels centering on a pixel to be an object of the high-frequency noise filtering (represented by white colored rectangle in FIG. 3(C)).

Next, a method performing a pipeline processing of the above-stated multi-resolution noise filtering is described in detail.

Views illustrating the pipeline processing are illustrated in FIG. 4(A) to FIG. 4(D).

When the noise filtered image data at row numbers 4 n, 4n+1, 4n+2, and 4n+3 are output from the high-frequency noise filtering part 28, data stored in each of the line memories, data generated at this timing and stored, and data deleted from the line memory at this timing are illustrated in FIGS. 4(A), 4(B), 4(C), and 4(D).

In FIGS. 4(A) to 4(D), data already stored in each of the line memories and held until the next timing are indicated by round marks. On the other hand, data deleted at this timing among the already stored data are indicated by triangles. Besides, data newly generated and stored are indicated by double circles.

Figure 4A:
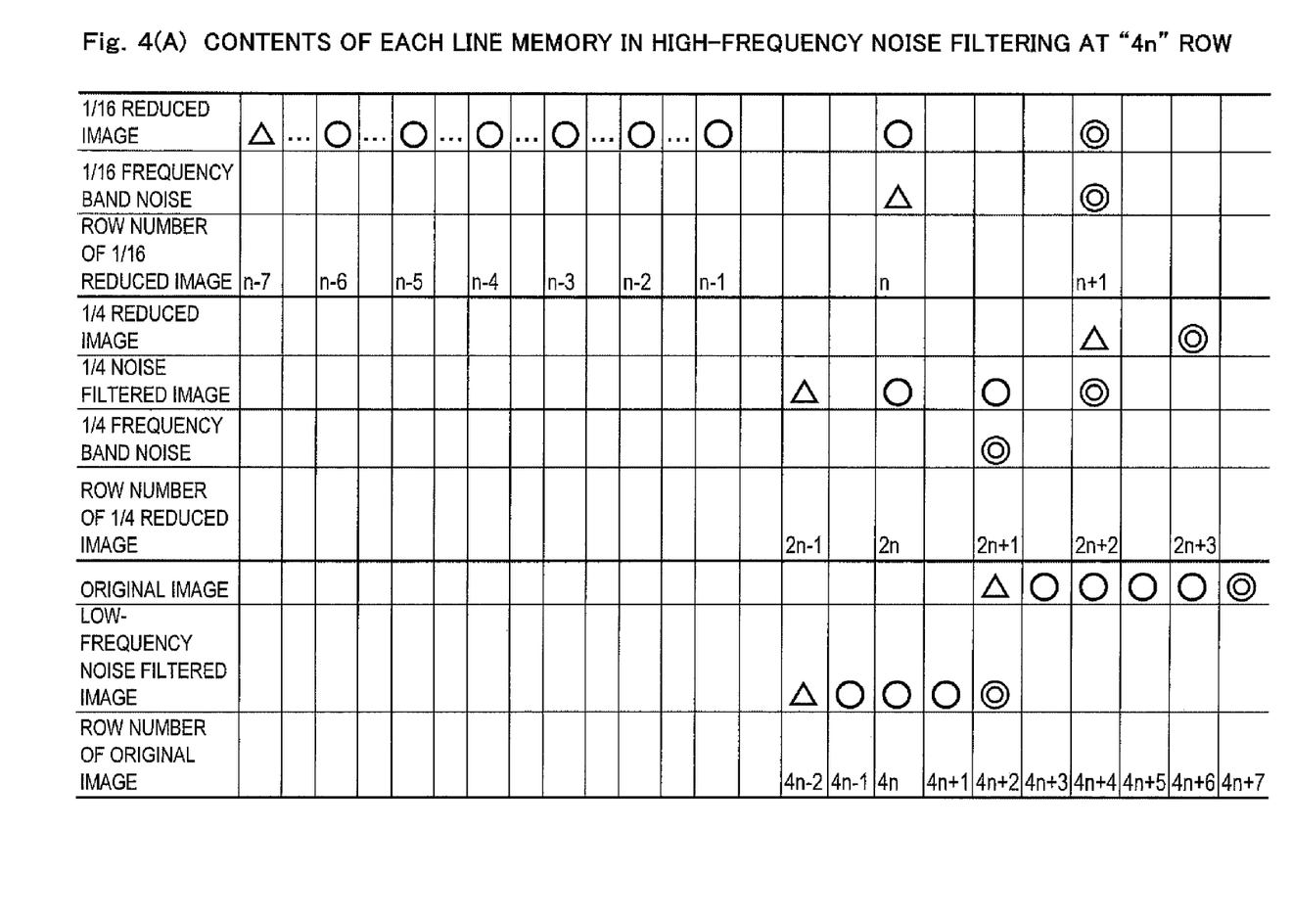

For example, in FIG. 4(A), the triangles and round marks at respective columns of the row corresponding to the ¹⁄₁₆ reduced image indicate that the "n−7" row to the "n" row of the ¹⁄₁₆ reduced image are stored in the line memory for the ¹⁄₁₆ reduced image size included in the reduced image storing memory 24. Besides, the triangle at the row corresponding to the ¼ reduced image indicates that the "2n+2" row of the ¼ reduced image is similarly stored in the line memory for the ¼ reduced image size of the reduced image storing memory 24. Besides, in FIG. 4(A), the triangles at the rows corresponding to the ¹⁄₁₆ frequency band noise indicate that the low-frequency noise component at the "n" row of the ¹⁄₁₆ reduced image is stored in the line memory for the ¹⁄₁₆ reduced image size of the ¼ noise component generating part 32. On the other hand, in FIG. 4(A), the triangles and the round marks at the rows corresponding to the ¼ noise filtered image indicate that the "2n−1" row to the "2n+1" row of the ¼ reduced image of which low-frequency noise component corresponding to the frequency band of the ¹⁄₁₆ reduced image is filtered are stored in the line memory for the ¼ reduced image size included in the ¼ frequency band noise extracting part 34. Besides, the triangle and the round marks at respective columns in the row corresponding to the original image indicate that the original image data at the "4n+2" row to the "4n+6" row are stored in the line memory of the original image storing memory 22. Further, the triangle and the round marks at respective columns in the row corresponding to the low-frequency noise filtered image indicate that the "4n−2" row to the "4n+1" row of the low-frequency noise free image data obtained by the noise subtracting part 27 are stored in the line memory for the original image size included in the high-frequency noise filtering part 28.

As it is described in FIG. 2 and FIGS. 3(A) to 3(C), the high-frequency noise filtering part 28 performs the noise filtering with reference to the range made up of the row to be the noise filtering object and two rows each before and after the row. Accordingly, the high-frequency noise filtering for the low-frequency noise free image data at the "4n" row is performed with reference to the low-frequency noise free image data for five rows up to the "4n+2" row, at the timing when the filtering of the low-frequency noise component is finished for the "4n+2" row by the noise subtracting part 27.

The filtering of the low-frequency noise component for the "4n+2" row of the original image is described. At first, the "4n+7" row of the original image data is read into the original image storing memory 22, and the "2n+3" row of the ¼ reduced image is generated by the image reducing part 23 based on the image data at the "4n+7" row and the "4n+6" row which is already stored. At the same time, the image reducing part 23 generates the "n+1" row of the ¹⁄₁₆ reduced image, and stores into the line memory respectively.

The ¹⁄₁₆ frequency band noise extracting part 31 extracts the low-frequency noise component at the frequency band corresponding to the ¹⁄₁₆ reduced image with respect to the "n+1" row of the ¹⁄₁₆ reduced image with reference to the range including the "n+1" row of the ¹⁄₁₆ reduced image generated as stated above (the "n−7" row to the "n+1" row). After the extraction processing is finished, the "n−7" row of the ¹⁄₁₆ reduced image becomes unnecessary.

The ¼ noise component generating part 32 performs the up-sampling processing using the low-frequency noise component at the "n" row stored in the line memory and a newly passed low-frequency noise component during a process when the low-frequency noise component at the frequency band corresponding to the ¹⁄₁₆ reduced image with correspond to the "n+1" row is passed from the ¹⁄₁₆ frequency band noise extracting part 31. The low-frequency noise component reflected on the ¼ reduced image is calculated by this processing. Besides, the low-frequency noise component at the "n+1" row extracted newly is stored in the line memory of the ¼ noise component generating part 32 instead of the low-frequency noise component at the "n" row. The calculated low-frequency noise component is subtracted from the image data at the "2n+2" row of the ¼ reduced image, and thereby, the "2n+2" row of the ¼ reduced image of which low-frequency noise component is filtered (¼ noise filtered image) is generated. The "2n+2" row of the ¼ noise filtered image generated by this processing is stored in the line memory of the ¼ frequency band noise extracting part 34.

The low-frequency noise component (¼ frequency band noise) corresponding to the "2n+1" row of the ¼ reduced image is extracted by the ¼ frequency band noise extracting part 34 with reference to the range of the ¼ noise filtered image (refer to FIG. 3(B)) including the "2n+2" row generated as stated above. The ¼ noise filtered image at the "2n−1" row stored in the line memory of the ¼ frequency band noise extracting part 34 becomes unnecessary after the extraction processing is finished.

On the other hand, the noise component combining part 35 combines the newly extracted ¼ frequency band noise component with the low-frequency noise component at the 1/16 frequency band which is performed the up-sampling into the ¼ reduced image size by the above-stated ¼ noise component generating unit 32. By performing the up-sampling on the combined result into the original image size by the up-sampling part 26, a combined low-frequency noise component corresponding to "4n+2" row of the original image is obtained. And thereafter, the noise subtracting part 27 subtracts the combined low-frequency noise component obtained by the up-sampling from the image data at the "4n+2" row stored in the original image storing memory 22. The "4n+2" row of the low-frequency noise free image data is obtained by this processing, and it is stored in the line memory of the high-frequency noise filtering part 28.

As stated above, the "4n+2" row of the low-frequency noise free image data is newly stored in the line memory in addition to the already stored low-frequency noise free image data at the "4n−2" row to the "4n+1" row. The high-frequency noise filtering is performed by the high-frequency noise filtering part 28 on the "4n" row at the center of the range of reference with reference to these low-frequency noises free image data. This processing result is output as the "4n" row of the image data of which high-frequency noise is filtered, and provided for a subsequent processing (for example, an image compression processing and so on). On the other hand, after this processing is finished, the "4n−2" row of the low-frequency noise free image data stored in the line memory becomes unnecessary.

As stated above, in the image processing equipment illustrated in FIG. 1 and FIG. 2, the range referred to when the low-frequency noise components at the frequency bands of the reduced images with the respective reduction ratios (for example, the ¼ reduced image and the 1/16 reduced image) are extracted is set toward the portion of reduced images corresponding to the portion of the original image which has already read in as illustrated in FIGS. 3(A) and 3(B). Accordingly, it is possible to make the range of the original image necessary to be read prior to the noise filtering object pixel to filter the low-frequency noise component small when the multi-resolution noise filtering is pipelined. Accordingly, it is possible to drastically reduce the amount of the image data accumulated in the line memory to wait for the noise filtering in the image processing equipment having the constitution as illustrated in FIG. 1 and FIG. 2.

Actually, as it can be seen from FIGS. 4(A) to 4(D), the line memories included in the pipelines corresponding to the image processing equipment 20 illustrated in FIG. 1 and FIG. 2 are a very few. For example, the line memories for the original image size are for nine lines putting together the line memory for five lines included in the original image storing memory 22 and the line memory for four lines included in the high-frequency noise filtering part 28. Besides, the line memories for the ¼ reduced image size are for five lines putting together one line for storing the ¼ reduced image, three lines for storing the ¼ noise filtered image, and one line for storing the ¼ frequency band noise component. A capacity of the five lines of the line memory for the ¼ reduced image is equivalent to only 5/2 line of the line memory of the original image size. As for the amount of the capacity of the line memories for the 1/16 reduced image, size is as little as the capacity of 9/4 line of the line memories for original image size, although the amount of line memories contains eight lines to store the 1/16 reduced image and one line to store the 1/16 frequency band noise component.

Figure 4B:
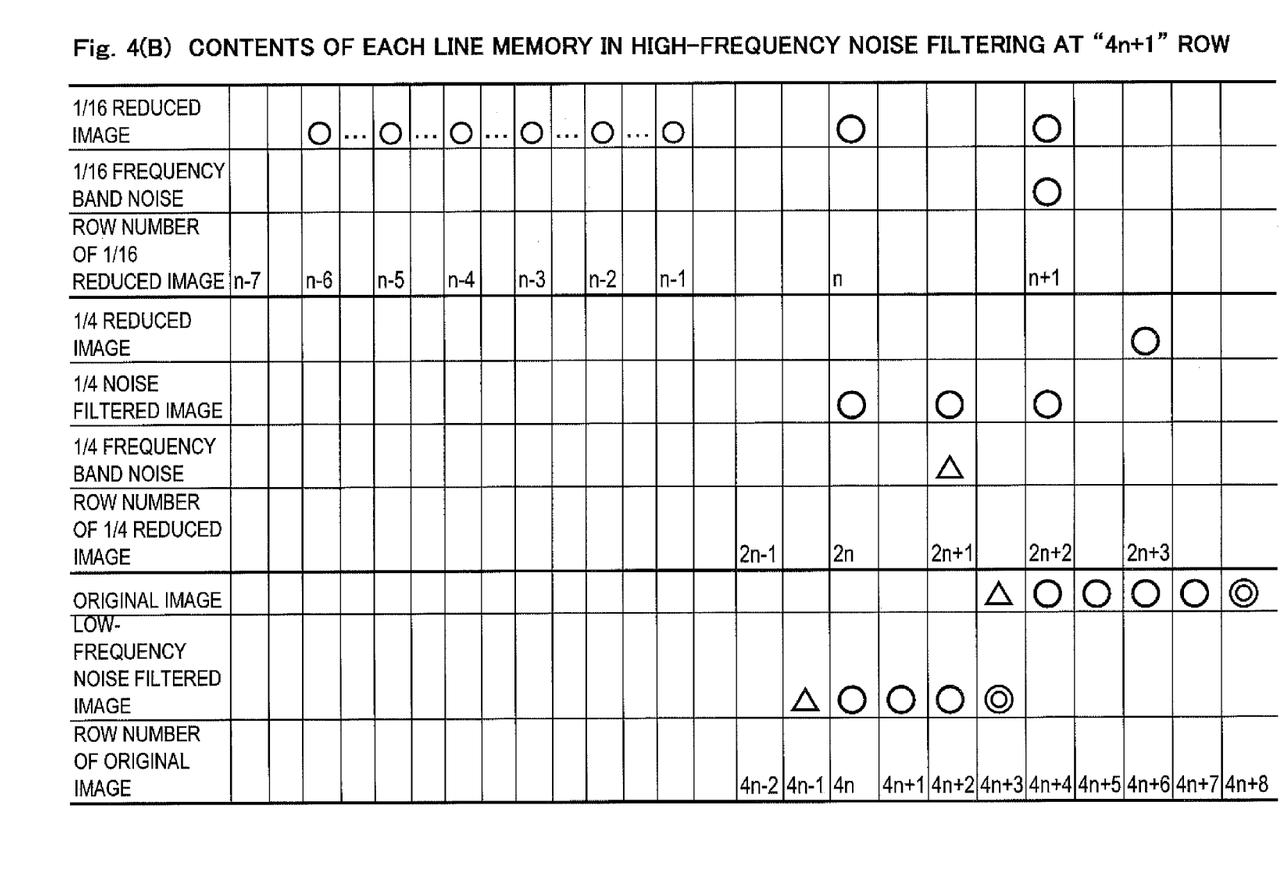

Next, the noise filtering of the row number "4n+1" is described with reference to FIG. 4(B). At this time, the "n−6" row to the "n+1" row of the 1/16 reduced image are stored in the line memory for the 1/16 reduced image size provided in the reduced image storing memory 24. Besides, the "2n+3" row of the ¼ reduced image is similarly stored in the line memory for the ¼ reduced image size of the reduced image storing memory 24. Besides, the low-frequency noise component of the "n+1" row at the 1/16 reduced image is stored in the line memory for the 1/16 reduced image size in the ¼ noise component generating part 32. This low-frequency noise component is represented as the 1/16 frequency band noise in FIGS. 4(A) to 4(D). On the other hand, the "2n" row to the "2n+2" row of the ¼ reduced image of which low-frequency noise component corresponding to the frequency band of the 1/16 reduced image is filtered are stored in the line memory for the ¼ reduce image size provided in the ¼ frequency band noise extracting part 34. These are represented as the ¼ noise filtered images in FIGS. 4(A) to 4(D). Besides, the original image data from the "4n+3" row to the "4n+7" row are stored in the line memory in the original image storing memory 22. The "4n−1" row to the "4n+2" row of the low-frequency noise free image data which are already obtained by the noise subtracting part 27 are stored in the line memory of the original image size provided in the high-frequency noise filtering part 28.

At this timing, the original image at the "4n+8" row is read and stored in the line memory in the original image storing memory 22. After that, the up-sampling processing is performed by the up-sampling part 26 on the low-frequency noise component stored in advance, and thereby, the low-frequency noise component corresponding to the "4n+3" row in the original image is generated. The low-frequency noise component obtained by the up-sampling processing is subtracted from the original image (the "4n+3" row) stored in the line memory, and the low-frequency noise free image data (the "4n+3" row) is obtained. The obtained low-frequency noise free image data (the "4n+3" row) is provided for the processing of the high-frequency noise filtering part 28, and used for the high-frequency noise filtering of the row number "4n+1".

Figure 4C:
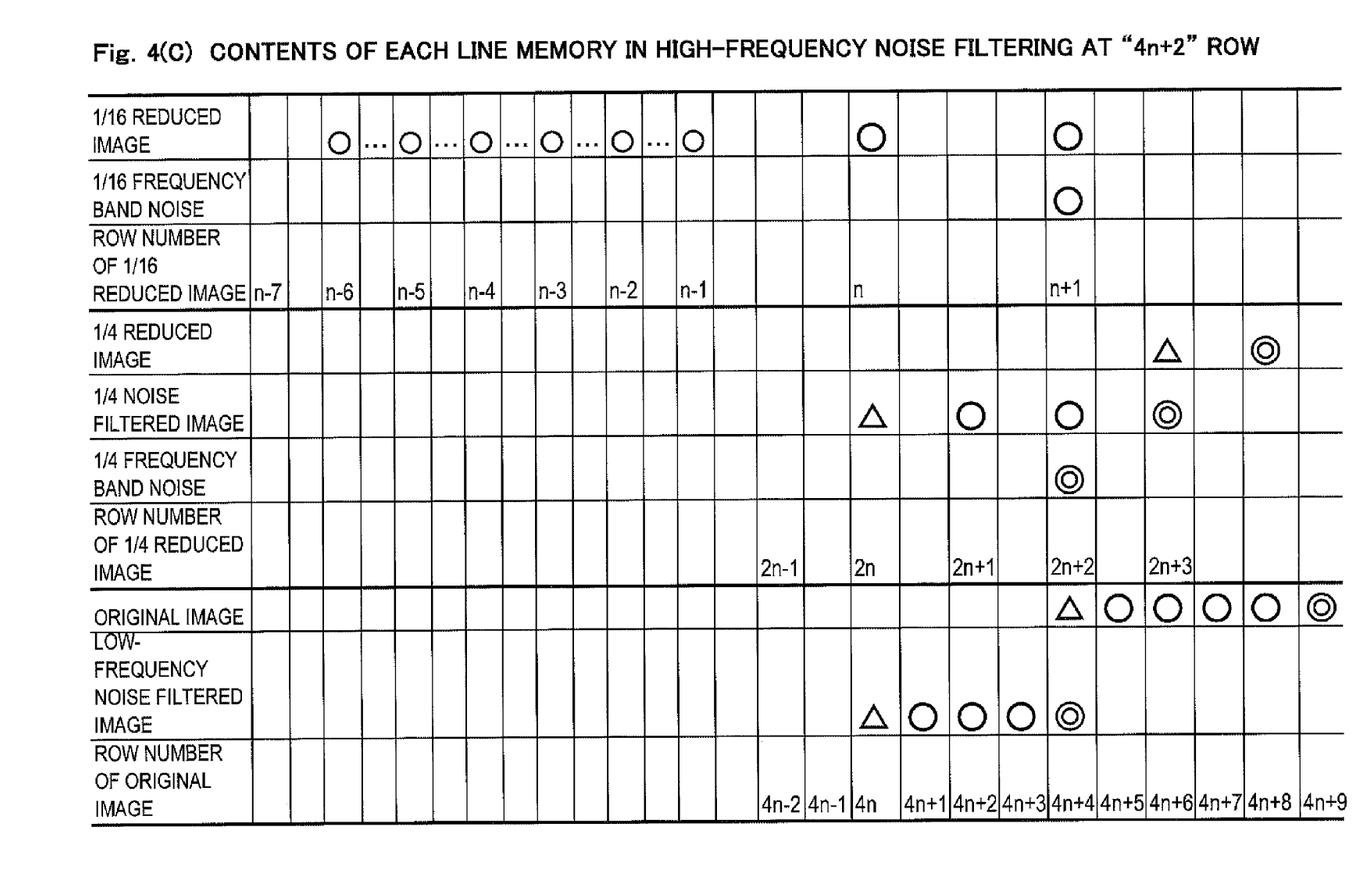

Next, the noise filtering of the row number "4n+2" is described with reference to FIG. 4(C). At this time, the "n−5" row to the "n+2" row of the 1/16 reduced image are stored in the line memory for the 1/16 reduced image size provided in the reduced image storing memory 24. Besides, the "2n+3" row of the ¼ reduced image is similarly stored in the line memory for the ¼ reduced image size in the reduced image storing memory 24. Besides, the low-frequency noise component at the "n+1" row of the 1/16 reduced image is stored in the line memory for the ¹⁄₁₆ reduced image size in the ¼ noise component generating part 32. This low-frequency noise component is represented as the ¹⁄₁₆ frequency band noise in FIGS. 4(A) to 4(D). On the other hand, the "2n" row to the "2n+2" row of the ¼ reduced image of which low-frequency noise component corresponding to the frequency band of the ¹⁄₁₆ reduced image is filtered is stored in the line memory for the ¼ reduced image size provided in the ¼ frequency band noise extracting part 34. These are represented as the ¼ noise filtered image in FIGS. 4(A) to 4(D). Besides, the original image data from the "4n+4" row to the "4n+8" row are stored in the line memory of the original image storing memory 22. Besides, the "4n" row to the "4n+3" row of the low-frequency noise free image data already obtained by the noise subtracting part 27 are stored in the line memory for the original image size provided in the high-frequency noise filtering part 28.

In this case, the "2n+4" row of the ¼ reduced image is generated based on the "4n+9" row of the original image data newly read into the original image storing memory 22 and the already stored image data at the "4n+8" row.

At this timing, the up-sampling is performed for the already calculated ¹⁄₁₆ frequency band noise component, and the low-frequency noise component corresponding to the "2n+3" row of the ¼ reduced image is generated. Besides, the "2n+3" row of the ¼ reduced image of which low-frequency noise component is filtered (the ¼ noise filtered image) is generated by subtracting the above-stated low-frequency noise component from the "2n+3" row of the ¼ reduced image stored in the line memory, and it is stored in the line memory of the ¼ frequency band noise extracting part 34.

The ¼ frequency band noise extracting part 34 extracts the low-frequency noise component corresponding to the "2n+2" row of the ¼ reduced image (¼ frequency band noise) with reference to the range of the ¼ noise filtered image including the "2n+3" row generated as stated above (refer to FIG. 3(C)). After the extraction processing is finished, the ¼ noise filtered image at the "2n" row stored in the line memory of the ¼ frequency band noise extracting part 34 becomes unnecessary.

On the other hand, the newly extracted ¼ frequency band noise component is combined with the low-frequency noise component at the ¹⁄₁₆ frequency band obtained by the above-stated up-sampling processing by the noise component combining part 35. By performing the up-sampling on this combined result into the original image size by the up-sampling part 26, a combined low-frequency noise component corresponding to "4n+4" row of the original image is obtained. And thereafter, it is subtracted from the image data at the "4n+4" row stored in the original image storing memory 22. The "4n+4" row of the low-frequency noise free image data is obtained by the subtracting processing. The obtained "4n+4" row of the low-frequency noise free image data is used for the high-frequency noise filtering at the row number "4n+2" by the high-frequency noise filtering part 28.

Figure 4D:
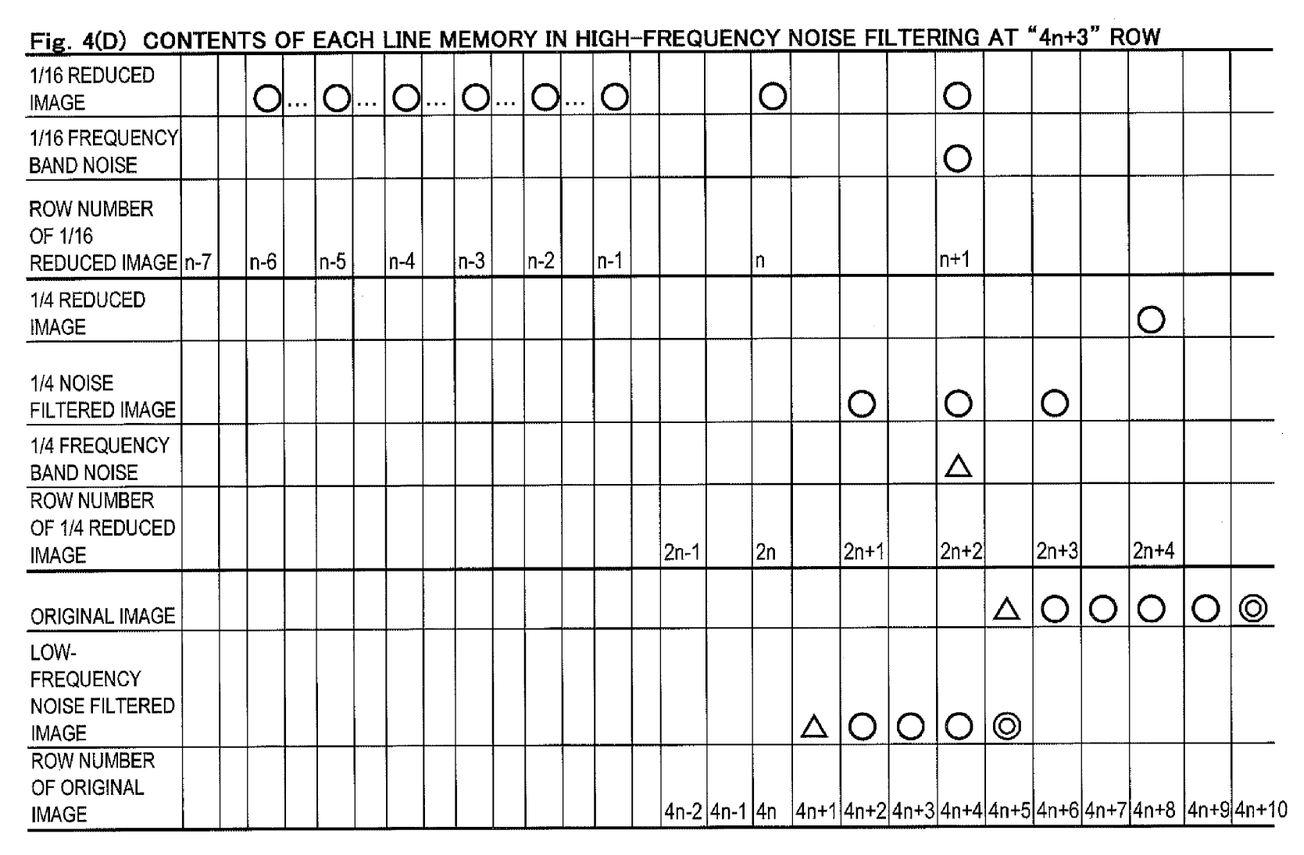

Next, the noise filtering of the row number "4n+3" is described with reference to FIG. 4(D). At this time, the "n−6" row to the "n+1" row of the ¹⁄₁₆ reduced image are stored in the line memory for the ¹⁄₁₆ reduced image size provided in the reduced image storing memory 24. Besides, the "2n+4" row of the ¼ reduced image is similarly stored in the line memory for the ¼ reduced image size of the reduced image storing memory 24. Besides, the low-frequency noise component at the "n+1" row of the ¹⁄₁₆ reduced image is stored in the line memory for the ¹⁄₁₆ reduced image size in the ¼ noise component generating part 32. This low-frequency noise component is represented by the ¹⁄₁₆ frequency band noise in FIGS. 4(A) to 4(D). On the other hand, the "2n+1" row to the "2n+3" row of the ¼ reduced image of which low-frequency noise component corresponding to the frequency band of the ¹⁄₁₆ reduced image is filtered are stored in the line memory for the ¼ reduced image size provided in the ¼ frequency band noise extracting part 34. These are represented as the ¼ noise filtered images in FIGS. 4(A) to 4(D). Besides, the original image data at the "4n+5" row to the "4n+9" row are stored in the line memory of the original image storing memory 22. The "4n+1" row to the "4n+4" row of the low-frequency noise free image data already obtained by the noise subtracting part 27 are stored in the line memory for the original image size provided in the high-frequency noise filtering part 28.

At this timing, the original data at the "4n+10" row is read, and stored in the line memory of the original image storing memory 22. After that, the up-sampling processing is performed by the up-sampling part 26 on the already stored low-frequency noise component, and thereby, the low-frequency noise component corresponding to the "4n+5" row in the original image is generated. The low-frequency noise component obtained by the up-sampling processing is subtracted from the original image (the "4n+5" row) stored in the line memory, and the low-frequency noise free image data (the "4n+5" row) is obtained. This low-frequency noise free image data (the "4n+5" row) is provided for the processing of the high-frequency noise filtering part 28, and used for the high-frequency noise filtering of the row number "4n+3".

Similarly, the processing for the image with the row number represented by increasing the value of the natural number "n" one by one is performed, and thereby, the multi-resolution noise filtering for the original image for one frame can be achieved by the pipeline processing using an extremely few line memories.

Incidentally, it is also possible to achieve the low-frequency noise filtering having larger spread by increasing stages of the multi-resolution noise filtering.

Embodiment 2

Figure 5:
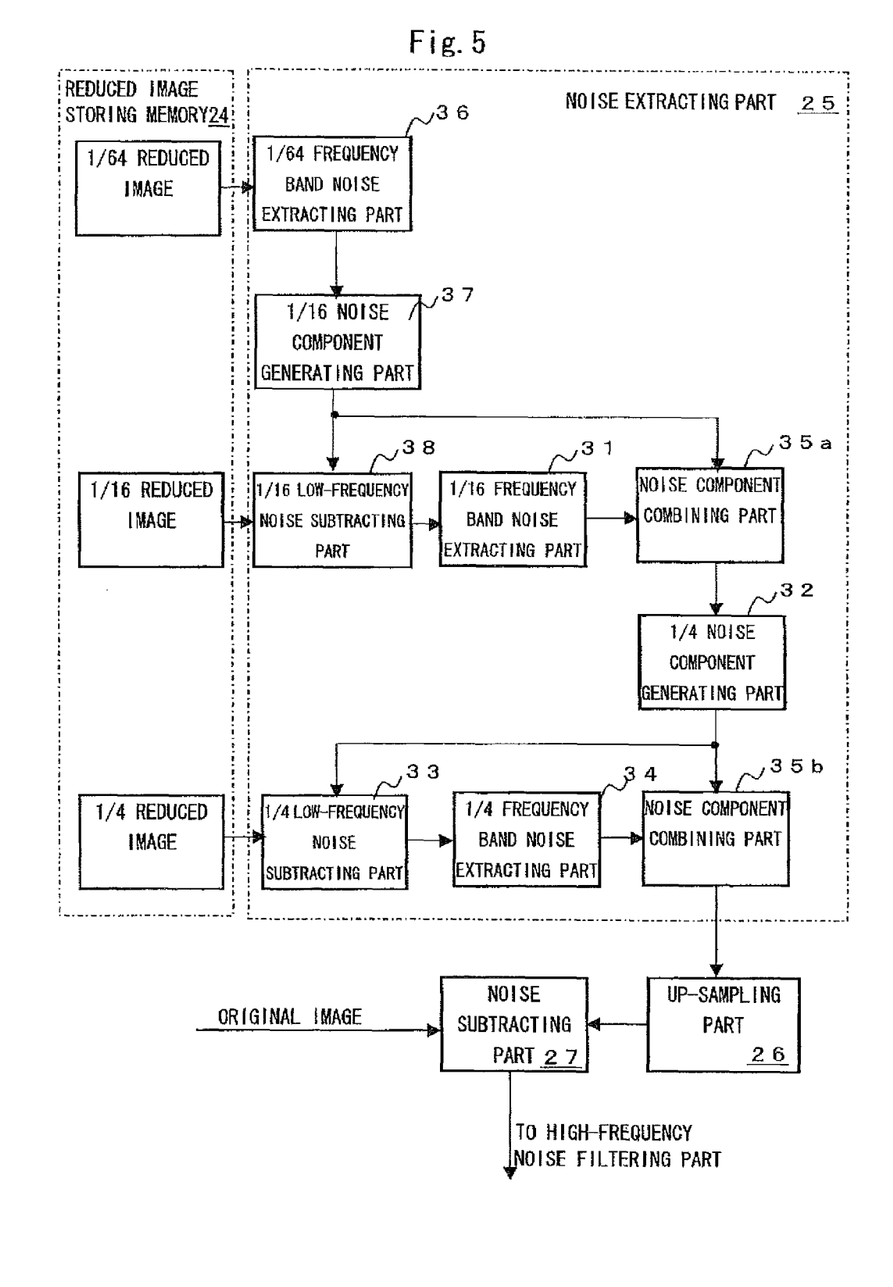
FIG. 5 is a view illustrating another embodiment of an image processing equipment.

Another embodiment of an image processing equipment is illustrated in FIG. 5.

Incidentally, among components illustrated in FIG. 5, the same reference numerals are added to the components having the same functions as the components illustrated in FIG. 1 and FIG. 2, and description thereof is not given.

In the noise extracting part 25 illustrated in FIG. 5, a ¹⁄₆₄ frequency band noise extracting part 36, a ¹⁄₁₆ noise component generating part 37, and a ¹⁄₁₆ low-frequency noise subtracting part 38 are included. By including these parts, it is possible to add new stage related to a low-frequency noise component at a frequency band corresponding to a ¹⁄₆₄ reduced image to a multiplicity of the multi-resolution noise filtering having each stage corresponding to the ¼ reduced image and the ¹⁄₁₆ reduced image.

Besides, the image processing equipment includes a structure possible to improve an extraction accuracy of the noise components at the frequency bands to the respective stages. The structure includes three elements. A first element performs the up-sampling for the low-frequency noises at the frequency bands extracted with correspond to the respective stages. A second element generates the reduced image having finished the noise filtering to the low-frequency noise at the frequency band corresponding to the respective stages by subtracting the result of the up-sampling of the first element from the reduced image in the next stage. A third element extracts the low-frequency noise at the frequency band which corresponds to the stage of the reduced image obtained from the subtracting process by the second element. Accordingly, an extraction accuracy of the noise components at the frequency bands corresponding to the respective stages can be improved.

Similarly, a further large number of reduced images with different reduction ratios can be generated to extract the low-frequency noises at the frequency bands corresponding to these reduced images. Thus, a multiplicity of the multi-resolution noise filtering can be enlarged.

On the other hand, it is also possible to apply the similar multi-resolution noise filtering for the reduced images generated with corresponding to the original image and the high-frequency component reproducing the original image by combining with this reduced image.

Embodiment 3

Figure 6:
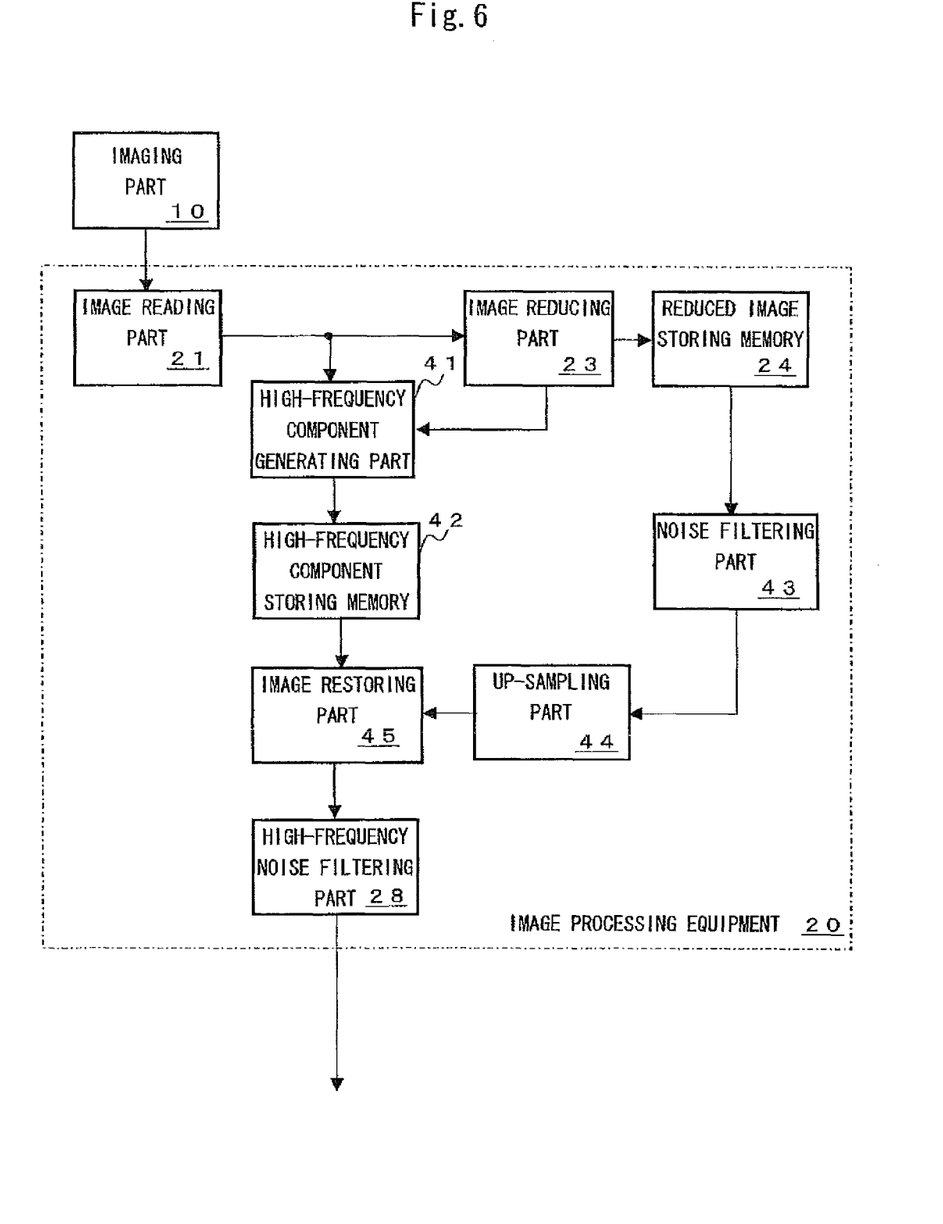
FIG. 6 is a view illustrating still another embodiment of an image processing equipment.

Another embodiment of an image processing equipment is illustrated in FIG. 6.

Incidentally, among components illustrated in FIG. 6, the same reference numerals are added to the components having the same functions as the components illustrated in FIG. 1 and FIG. 2, and description thereof is not given.

In the image processing equipment illustrated in FIG. 6, an image data read by the image reading part 21 is converted into a reduced image by the image reducing part 23. Concurrently with this process, a process of generating a high-frequency component is performed by a high-frequency component generating part 41 based on the same image. This high-frequency component is generated so as to reproduce the original image by combining with the above-stated reduced image. A high-frequency component generating part 41, for example, can generate a high-frequency component by using a low-resolution image corresponding to the reduced image obtained at the image reducing part 23. Such low-resolution image can be obtained by applying an expansion processing to the reduced image. The generated reduced image and the high-frequency component are respectively stored in the reduced image storing memory 24 and a high-frequency component storing memory 42.

Incidentally, it is possible to generate the high-frequency component in the high-frequency component generating part 41 as similar techniques using a wavelet transform or Laplacian pyramid.

A noise filtering part 43 performs the noise filtering referring a range set toward the portion of reduced image which have stored in the reduced image storing memory 24 before storing a portion of reduced image of which contains a pixel of reduced image corresponding to the filtering object pixel. Accordingly, the amount of the line memories necessary to achieve the pipeline processing can be reduced as same as the above-stated embodiment 1.

An up-sampling part 44 performs an up-sampling for the reduced image of which low-frequency noise component is filtered by this noise filtering part 43 into the original image size. The image obtained by the up-sampling processing and the high-frequency component stored in the high-frequency component storing memory 42 are combined by an image restoring part 45. An image with the original image size of which low-frequency noise is filtered is generated by this combining processing, and the processing of the high-frequency noise filtering part 28 is performed on the image.

The image processing equipment and the digital camera described hereinabove include a structure in which the low-frequency noise component is extracted for the noise filtering object pixel with reference to the range of the reduced image, which the range is set toward to the portion of the reduced image corresponding to the portion of the original image of which reading is finished prior to the noise filtering object pixel. It is possible to reduce the range of the original image to be stored in the line memory when the low-frequency noise filtering applying the multi-resolution noise filtering technology is achieved by the pipeline, by having the constitution as stated above.

Applying the above described constitution, it is possible to achieve the pipelined system with much less than alternative pipelined system which extracts the low-frequency noise component with reference to the range of the reduced image corresponding to the portion of the original image and a center of the range of the reduced image coincides with the noise filtering object pixel.

A high-frequency component generating part 41, for example, can generate a high-frequency component by using a low-resolution image, which obtained by applying an expansion processing to the reduced image, corresponding to the reduced image obtained at the image reducing part 23.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing equipment, comprising:
a line memory sequentially storing respective pixel values of pixels arranged in N rows M columns included in a processing object image and having a fewer number of rows than the N rows;
an image reducing part sequentially generating a portion of a reduced image based on a portion of the processing object image stored in the line memory;
a reduced image storing memory storing the reduced image generated at the image reducing part;
a noise extracting part extracting a noise component of a noise filtering object pixel from an area in the reduced image stored in the reduced image storing memory, the area being selected to include the noise filtering object pixel;
an up-sampling part calculating a noise component corresponding to a noise filtering object pixel of the processing object image by performing an up-sampling processing on the noise component being extracted; and
a noise subtracting part performing subtraction of the noise component calculated at the up-sampling part from a pixel value of the noise filtering object pixel of the processing object image stored in the line memory, and outputting a pixel value after the subtraction.

2. An image processing equipment, comprising:
a line memory sequentially storing respective pixel values of pixels arranged in N rows M columns included in a processing object image, and having a fewer number of rows than the N rows;
an image reducing part sequentially generating a portion of at least one of reduced images based on a portion of the processing object image stored in the line memory;
a reduced image storing memory storing a range corresponding to each of at least one of the reduced images, the range includes a range corresponding to a row including a noise filtering object pixel, a range corresponding to predetermined number of rows generated prior to the range including the noise filtering object pixel, and a range corresponding to another predetermined number of rows having fewer number of rows than the predetermined number of rows and generated subsequent to the range including the noise filtering object pixel;

a noise extracting part extracting a noise component of a noise filtering object pixel from an area in at least one of the reduced images stored in the reduced image storing memory, the area being selected to include the noise filtering object pixel;

an up-sampling part calculating a noise component corresponding to a noise filtering object pixel of the processing object image by performing an up-sampling processing on the noise component being extracted, and a noise subtracting part performing subtraction of the noise component calculated at the up-sampling part from a pixel value of the noise filtering object pixel of the processing object image stored in the line memory and outputting a pixel value after the subtraction.

3. The image processing equipment according to claim 2, wherein the noise extracting part extracts the noise component from an area being selected to include the range corresponding to the row including the noise filtering object pixel and the range corresponding to the predetermined number of rows generated prior to the row among each of the reduced images stored in the reduce image storing memory.

4. The image processing equipment according to claim 2, wherein the image reducing part generates a plurality of reduced images having different reduction ratios, the reduced image storing memory stores the plurality of reduced images, the noise extracting part generates noise components at a plurality of frequency bands each corresponding to the plurality of reduction ratios by extracting the noise component from each area selected for the plurality of reduced images, the up-sampling part performs the up-samplings on the noise components corresponding to the plurality of the frequency bands respectively, and calculates noise components at the plurality of the frequency bands corresponding to the noise filtering object pixel of the processing object image, and the noise subtracting part filters a noise by subtracting a sum of the noise components at the plurality of the frequency bands calculated at the up-sampling part from the pixel value of the noise filtering object pixel of the processing object image stored in the line memory.

5. The image processing equipment according to claim 4, wherein the noise extracting part includes:

a gradual extracting part sequentially performing a noise extraction in stages storing from a low frequency band among the frequency bands respectively corresponding to the plurality of reduction ratios, and transferring the noise components obtained by the noise extraction performed at each stage a processing of the noise subtracting part as the noise components at the frequency bands corresponding to each stage; and an extraction controlling part subtracting the noise components at the frequency bands extracted corresponding to each stage at the gradual extracting part from a pixel value of the noise filtering object pixel of the reduced image of the reduction ratios related to the stage, and transferring a reduced image obtained from a subtraction result as the reduced image having a reduction ratio related to the stage to a processing of the gradual extracting part.

6. An image processing equipment, comprising:

an image reading part sequentially reading respective pixel values of pixels of a processing object image arranged in N rows M columns;

an image reducing part generating a portion of a reduced image corresponding to an area including the pixels of the processing object image by performing a down-sampling on the pixels being read with a predetermined ratio;

a high-frequency component generating part generating a high-frequency component data reproducing the processing object image by combining a low-resolution image obtained by applying an expansion processing to the reduced image;

a high-frequency component storing memory storing the high-frequency component data for a predetermined range;

a reduced image storing memory storing a range of the reduced image, the range includes a range corresponding to a row including a noise filtering object pixel, a range corresponding to predetermined number of rows generated prior to the range including the noise filtering object pixel, and a range corresponding to another predetermined number of rows having fewer number of rows than the predetermined number of rows and generated subsequent to the range including the noise filtering object pixel;

a reduced image noise filtering part performing a noise filtering on the reduced image stored in the reduced image storing memory;

an up-sampling part generating an image of an equivalent size to the processing object image by performing the up-sampling for the reduced image being performed the noise filtering; and an image restoring part restoring an image in an original size of which a low-frequency noise is filtered by combining the high-frequency component data stored in the high-frequency component storing memory and the image generated at the up-sampling part.

7. A digital camera, comprising:

an imaging part obtaining an image having pixels in N rows M columns;

a line memory sequentially storing respective pixel values of pixels of a processing object image obtained by the imaging part, and having a fewer number of rows than the N rows;

an image reducing part sequentially generating a portion of a reduced image based on a portion of the processing object image stored in the line memory;

a reduced image storing memory storing the reduced image generated at the image reducing part;

a noise extracting part extracting a noise component of a noise filtering object pixel from an area in the reduced image stored in the reduced image storing memory, the area being selected to include the noise filtering object pixel;

an up-sampling part calculating a noise component corresponding to a noise filtering object pixel of the processing object image by performing an up-sampling processing on the noise component being extracted; and a noise subtracting part performing subtraction of the noise component calculated at the up-sampling part from a pixel value of the noise filtering object pixel of the processing object image stored in the line memory and outputting a pixel value after the subtraction.

8. A digital camera, comprising:

an imaging part obtaining an image having pixels in N rows M columns;

a line memory sequentially storing respective pixel values of pixels of a processing object image obtained by the imaging part, and having a fewer number of rows than the N rows;

an image reducing part sequentially generating a portion of at least one of reduced images based on a portion of the processing object image stored in the line memory;

a reduced image storing memory storing a range corresponding to each of at least one of the reduced images, the range includes a range corresponding to a row including a noise filtering object pixel, a range corresponding to predetermined number of rows generated prior to the range including the noise filtering object pixel, and a range corresponding to another predetermined number of rows having fewer number of rows than the predetermined number of rows and generated subsequent to the range including the noise filtering object pixel;

a noise extracting part extracting a noise component of a noise filtering object pixel from an area in at least one of the reduced images stored in the reduced image storing memory, the area being selected to include the noise filtering object pixel;

an up-sampling part calculating a noise component corresponding to a noise filtering object pixel of the processing object image by performing an up-sampling processing on the noise component being extracted; and a noise subtracting part performing subtraction of the noise component calculated at the up-sampling part from a pixel value of the noise filtering object pixel of the processing object image stored in the line memory and outputting a pixel value after the subtraction.

9. A digital camera, comprising:

an imaging part obtaining an image having pixels in N rows M columns;

an image reading part sequentially reading respective pixel values of pixels of a processing object image obtained by the imaging part;

an image reducing part generating a portion of a reduced image corresponding to an area including the pixels of the processing object image by performing a down-sampling on the pixels being read with a predetermined ratio;

a high-frequency component generating part generating a high-frequency component data reproducing the processing object image by combining a low-resolution image obtained by applying an expansion processing to the reduced image;

a high-frequency component storing memory storing the high-frequency component data for a predetermined range;

a reduced image storing memory storing a range of the reduced image, the range includes a range corresponding to a row including a noise filtering object pixel, a range corresponding to predetermined number of rows generated prior to the range including the noise filtering object pixel, and a range corresponding to another predetermined number of rows having fewer number of rows than the predetermined number of rows and generated subsequent to the range including the noise filtering object pixel;

a reduced image noise filtering part performing a noise filtering on the reduced image stored in the reduced image storing memory;

an up-sampling part generating an image of an equivalent size to the processing object image by performing the up-sampling for the reduced image being performed the noise filtering; and an image restoring part restoring an image in an original size of which a low-frequency noise is filtered by combining the high-frequency component data stored in the high-frequency component storing memory and the image generated at the up-sampling part.

* * * * *